(12) United States Patent
Busch et al.

(10) Patent No.: US 10,182,151 B2
(45) Date of Patent: Jan. 15, 2019

(54) SYSTEM AND METHOD FOR AN INTERACTION PAGE

(71) Applicants: Carsten Busch, Weinheim (DE); Christian Klumpp, Karlsruhe (DE)

(72) Inventors: Carsten Busch, Weinheim (DE); Christian Klumpp, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/227,050

(22) Filed: Mar. 27, 2014

(65) Prior Publication Data

US 2015/0281444 A1    Oct. 1, 2015

(51) Int. Cl.
| | |
|---|---|
| *H04M 3/51* | (2006.01) |
| *G06Q 30/00* | (2012.01) |
| *H04M 7/00* | (2006.01) |
| *H04M 3/42* | (2006.01) |
| *H04M 3/436* | (2006.01) |

(52) U.S. Cl.
CPC ........ *H04M 3/5133* (2013.01); *G06Q 30/016* (2013.01); *H04M 3/5141* (2013.01); *H04M 7/0024* (2013.01); *H04M 3/42059* (2013.01); *H04M 3/42348* (2013.01); *H04M 3/436* (2013.01); *H04M 3/5175* (2013.01)

(58) Field of Classification Search
CPC . H04M 3/5133; H04M 3/5175; G06Q 30/016
USPC ............................ 379/93.17, 265.03, 265.09
See application file for complete search history.

(56) References Cited

U.S. PATENT DOCUMENTS

| | | | |
|---|---|---|---|
| 7,593,522 B2 | 9/2009 | Parker-Stephen | |
| 8,447,016 B1 | 5/2013 | Kugler et al. | |
| 2010/0235268 A1* | 9/2010 | Conrad | G06Q 10/10 |
| | | | 705/30 |
| 2011/0299676 A1* | 12/2011 | Hanson et al. | 379/265.03 |
| 2015/0036813 A1* | 2/2015 | Ananthakrishnan | |
| | | | H04M 7/0027 |
| | | | 379/265.09 |

OTHER PUBLICATIONS

"Communication: European Search Report", dated Apr. 14, 2016, European Patent Office, for European Patent Application No. 15161323.9-1851, 11 pp.
"Communication: Partial European Search Report", dated Dec. 23, 2015, European Patent Office, for European Patent Application No. 15161323.9-1851, 7pgs.
"Communication pursuant to Article 94(3) EPC: European Office Action", dated Nov. 2, 2017 (Nov. 2, 2017), European Patent Office, for European Patent Application No. 15161323.9-1853, 5 pp.

* cited by examiner

*Primary Examiner* — Antim G Shah
(74) *Attorney, Agent, or Firm* — Buckley, Maschoff & Talwalker LLC

(57) ABSTRACT

A system and method that includes receiving a call from a customer; determining, in response to receiving the call, interactions with the customer and relevant business objects relating to the interactions; and presenting, simultaneously in a user interface display pane, representations of the interactions and the relevant business objects relating to the interactions.

16 Claims, 16 Drawing Sheets

FIG. 4

CRM INTERACTION CENTER
HOME INBOX CALL LIST MANDY BERG

| NOTES | SCRIPTS | KNOWLEDGE ARTICLES (3) | NOT COMPLETED ITEMS (3) | INDEX |

Current Connection
Channel: Phone Inbound Connected
Calling from: +13331236789
Calling to: Phone (1) +15550317
Time: 0:07/0:07    420

Main Partner (CRMICUNI)
Mrs. Mandy Berg
Sietmar Hopp Allee 16
D-69190 Walldorf
mb.berg7@googlemail.com
T +49 62277 99999
F +49 62277 88888    430

Product Component (569)
Description: Pool Notebook
Identification: SRN 1098T430
Validity: 2011.03.12-2014.03.11
Product: Notebook Professio...
Product ID: HT-1010
Quantity: 1    435

Interaction Record (New)*
Subject: How to change a hard disk...
Reason: Customer Inquiry
Priority: Medium
Mandy Berg complaints about the insufficient operating instructions of her new HT-1010. Detailed information missing regarding exchange of the hard disk.    425

Knowledge Article (47110815)
Subject: User's Guide HT-1010
Problem
Handling issue for HT-1010 due to missing Instructions...
Solution
Please refer to the respective chapters of the attached user's manual and the included exploded drawing....    450

Service Request (New)*
Subject: How to change a hard disk...
Account: Ms. Mandy Berg
Reporter:
Status: New
Impact: Medium
Urgency: Medium
priority: Medium
Response By: 2013.05.22 13:00
Due By: 2013.06.23 17:00    445

E-Mail-Outbound (Draft)*
To: Mandy Berg
Subject: Change hard disk HT-1010....
Dear Mandy Berg
Please find attached the user's manual which guides you to the instructions belonging to change of components for...    440

400
405
410
415

CRM INTERACTION CENTER — 520
HOME  INBOX  CALL LIST  MANDY BERG

Logged In as
User: CRMICUNIAA
       Angela Agent
Role: IC_AGENT
      Interaction Center A...
CMS: SAPCSS
QDD: /wdf.sap.corp        505

Channels
☑ Telephony
☑ E-Mail
☑ Chat

Ready ▶

Queues
☑ Hotline
☑ Order Entry
☑ Infoline

510

My Open Items
Overdue
▲ 11
Details

Open Items
2nd Level Sup.
▼ 23
Details

Unfinished
E-Mails
3
Details

Campaign HT-1010
March 13th, 2013–April, 31st 2013
23 (189)
Details

Open Calls
Customer
Satisfaction
February 1st, 2013–May 31st, 2013
87 (690)
Details

Appointment
Scheduling
June 1st, 2013–June 30th, 2013
3 (67)                515
Details ☺ Toni Teamlead
  Head of Service Center
  High number of customer
  request expected belonging
  to marketing campaign
  Details
⊙ March 14th, 2013 –11:35

☺ Boris Back-Office
  2nd Level Support
  HT-1010 battery issue
  already addressed in Case
  47110815
  Details
⊙ March 14th, 2013 –11:20

☺ Angela Agent
  Assistant
  Training for "marketing"
  Permissions will start at
  5:00 pm
  Details
⊙ March 14th, 2013 –10:12
Recent Messages (3)

My Favorites
PC4U Home Page
My G-Mail
Service Guideline

*FIG. 5*

CRM INTERACTION CENTER
HOME INBOX CALL LIST MANDY BERG

Current Connection
Channel: Phone Inbound Connected
Calling from: +13331236789 Phone (1)
Calling to: +15550317
Time: 0:07/0:07

Main Partner (CRMICUNI)
Mrs. Mandy Berg
Sietmar Hopp Allee 16
D-69190 Walldorf
mb.berg7@googlemail.com
T +49 62277 99999
F +49 62277 88888
710

Related Partners
Registered Products
Address
Communication
Notes History
Last Interaction
715

NOT COMPLETED ITEMS (2)

Registered Products
HT-1010   Notebook Professional
          SRN 1098T430
HT-1052   DeskJet Super Highspeed
          SRN 1001H571
Warranty2  2 years service warranty
           2011.03.12 – 2013.03.11
720

Interaction Record (New)*
Subject: How to change a hard disk...
Reason: Customer Inquiry
Priority: Medium
Mandy Berg complaints about the insufficient operating instructions of her new HT-1010. Detailed information missing regarding exchange of the hard disk.
705

CRM INTERACTION CENTER
HOME  INBOX  CALL LIST  MANDY BERG

Current Connection
Channel: Phone Inbound Connected
Calling from: +13331236789
Calling to: Phone (1) +15550317
Time: 0:07/0:07

Main Partner (CRMICUNI)
Mrs. Mandy Berg
Sietmar Hopp Allee 16
D-69190 Walldorf
mb.berg7@googlemail.com
T +49 62277 99999
F +49 62277 88888

NOT COMPLETED ITEMS (2)

Product Component (569)
Description: Pool Notebook
Identification: SRN 1098T430
Validity: 2011.03.12–2014.03.11
Product: Notebook Professio...
Product ID: HT-1010
Quantity: 1

Interaction Record (New)*
Subject: How to change a hard disk...
Reason: Customer Inquiry
Priority: Medium Mandy Berg complaints about the insufficient operating instructions of her new HT-1010. Detailed information missing regarding exchange of the hard disk.

Knowledge Article (47110815)
Subject: User's Guide HT-1010
Problem
Handling issue for HT-1010 due to missing Instructions...
Solution
Please refer to the respective chapters of the attached user's manual and the included exploded drawing....

KNOWLEDGE ARTICLES (5)

Service Request (New)*
Subject: How to change a hard disk...
Account: Ms. Mandy Berg
Reporter:
Status: New
Impact: Medium
Urgency: Medium
priority: Medium
Response By: 2013.05.22 13:00
Due By: 2013.06.23 17:00

E-Mail-Outbound (Draft)*
To: Mandy Berg
Subject: Change hard disk HT-1010...

Dear Mandy Berg
Please find attached the user's manual which guides you to the instructions belonging to change of components for....

CRM INTERACTION CENTER
HOME  INBOX  CALL LIST  MANDY BERG

NOT COMPLETED ITEMS (2) | KNOWLEDGE ARTICLES (5)

Current Connection
Channel:        Phone Inbound
                Connected
Calling from:   +13331236789
Calling to:     Phone (1)
                +15550317
Time:           0:07/0:07

Main Partner (CRMICUNI)
Mrs. Mandy Berg
Sietmar Hopp Allee 16
D-69190 Walldorf mb.berg7@googlemail.com
T +49 62277 99999
F +49 62277 88888

Product Component (569)
Description:      Pool Notebook
Identification:   SRN 1098T430
Validity:         2011.03.12–2014.03.11
Product:          Notebook Professio...
Product ID:       HT-1010
Quantity:         1

Interaction Record (New)*
Subject:   How to change a hard disk...
Reason:    Customer Inquiry
Priority:  Medium Mandy Berg complaints about the insufficient
operating instructions of her new HT-1010.
Detailed information missing regarding
exchange of the hard disk.

Knowledge Article (47110815)
Subject:    User's Guide HT-1010
Problem
Handling issue for HT-1010 due to missing
Instructions...
Solution
Please refer to the respective chapters of the
attached user's manual and the included
exploded drawing....

Service Request (New)*
Subject:      How to change a hard disk...
Account:      Ms. Mandy Berg
Reporter:
Status:       New
Impact:       Medium
Urgency:      Medium
priority:     Medium
Response By:  2013.05.22 13:00
Due By:       2013.06.23 17:00

E-Mail-Outbound (Draft)*
To:       Mandy Berg
Subject:  Change hard disk HT-1010....         1305

Dear Mandy Berg
Please find attached the user's manual which
guides you to the instructions belonging to
change of components for....

1310

SYSTEM AND METHOD FOR AN INTERACTION PAGE

BACKGROUND

Field

The embodiments described below relate to technical improvements in the configuration, presentation, and navigation of interaction pages.

Description

Agents working in an interaction center such as a call center may use a number of automated computer systems to interact with a customer while on a call with the customer. In some instances, the agent may have to navigate from one program, display pane, or screen area to another in order to access all of the information related to the agent's interaction with the customer. In some instances, the agent may have to execute numerous navigation gestures and actions during a typical interaction with the customer. In some typical scenarios, information relating to the customer and the on-going, current interaction may be dispersed over different areas of a user interface, where only some of the pertinent information is displayed at any one time. In the event the information is not displayed, the user must perform additional user interface tasks to access the desired but not displayed information.

In some conventional systems, customer related information and transactions, including context supporting documents, have to be searched for by navigating to different screens, applications, and user interfaces, without any visual connection between the various related information items.

Conventional interaction systems fail to efficiently inform a user of the relevant information associated with a customer and their interaction(s) with a business entity via a user interface interaction page.

BRIEF DESCRIPTION OF THE DRAWINGS

The construction and usage of embodiments will become readily apparent from consideration of the following specification as illustrated in the accompanying drawings, in which like reference numerals designate like parts, and wherein:

FIG. 4 illustrates an overview of an interaction page, according to some embodiments;

FIGS. 5-13 illustrate various aspects of an interaction page, according to some embodiments;

DETAILED DESCRIPTION

The following description is provided to enable any person in the art to make and use the described embodiments. Various modifications, however, will remain readily apparent to those in the art.

Figure 1:
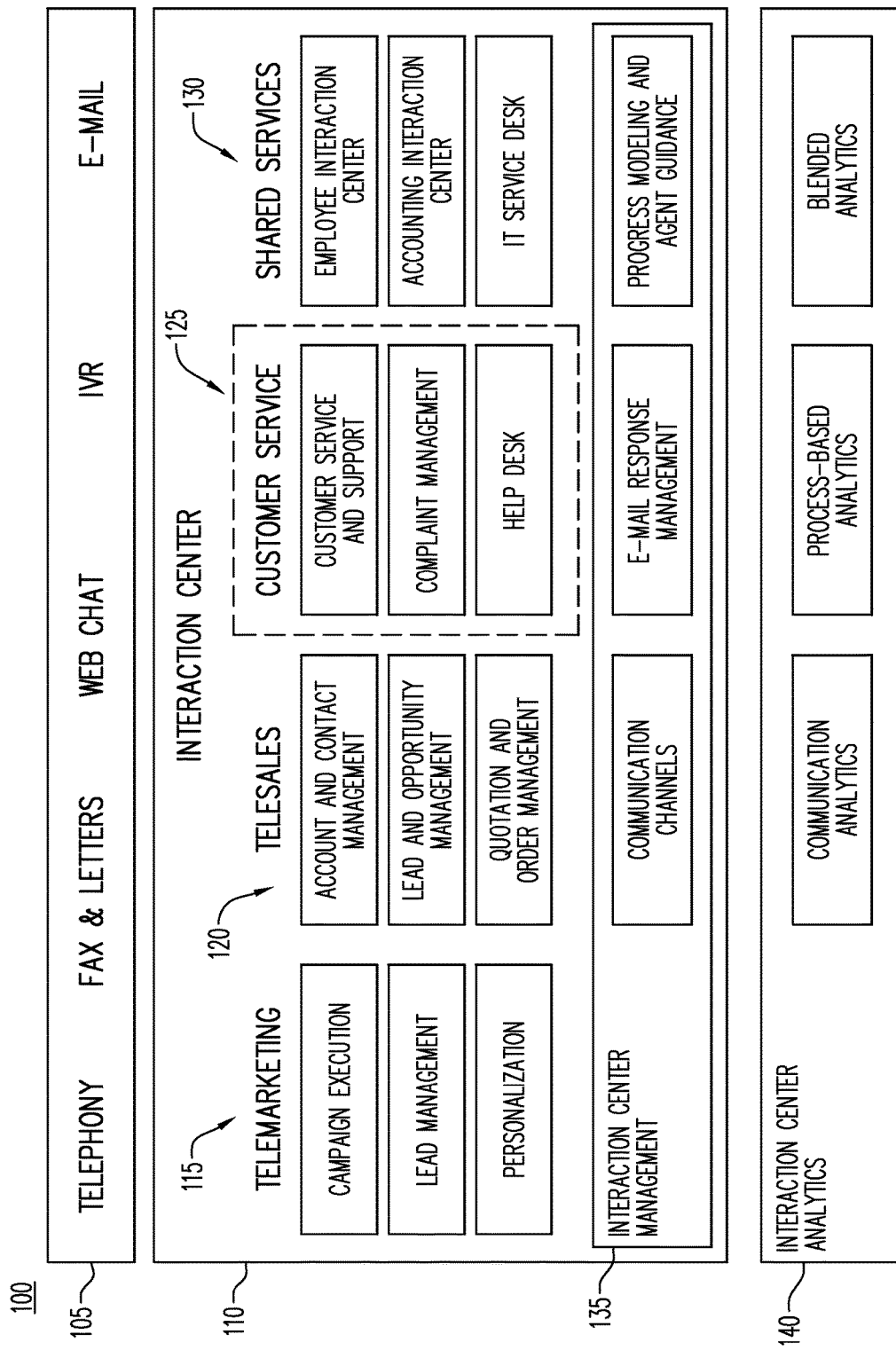
FIG. 1 illustrates aspects of an interaction center, according to some embodiments.

FIG. 1 illustrates aspects of an interaction center 100. Interaction center 100 may relate to a customer relationship management (CRM) system and/or service. Interaction center 100 may include a platform or infrastructure that facilitates communication and interaction between a customer and a business organization. A customer may communicate with a representative of the business organization via one or more different communication channels 105. In some instances, the customer may use more than one of the communication channels at the same time or at least during a same communication session. Communication channels 105 may include any form of communication known or that becomes known, including but not limited to the examples illustrated in FIG. 1.

In some embodiments, interaction center 100 may relate to different business functions. The business functions supported by interaction center 100 may correspond to business processes performed by a business entity and can include, for example, the business processes of telemarketing 115, telesales 120, customer service 125, and shared services 130 and the (sub-) process thereof. The business functionalities may be supported and implemented by one or devices and systems including computers and processors executing program code or instructions that store and retrieve data from a memory.

In some embodiments, a business process herein may be represented by a "business object" (BO) that is a modeled data structure. The data structure has fields with attributes and may have associated methods and queries that use those (or other) attributes as inputs or parameters in executing the associated methods and queries. As an example, the BO "customer" may have attributes such as "name", "mailing address", "billing address", etc.; the BO "service ticket" may have fields with attributes such as "related product", "issue", etc. In some aspects, a BO may be defined by metadata that describes the attribute fields. Furthermore, a business object herein may refer to a particular data set according to the data structure (i.e. an instance, instantiation, of the BO data structure). For example, interaction center 100 may generate a service ticket documenting an interaction between a particular customer and a company where the interaction includes a complaint of the customer regarding a specific product sold by the company that is experiencing a particular issue. As part of the interaction, a customer service representative of the company may provide a solution to the customer's particular issue in the form of a set of instructions attached to an email that is sent to the customer. The records of the interactions including the service ticket, the service complaint, the email sent to the customer, the document including the solution that is attached to the email. Etc. are particular instances of the BOs.

The business functionalities or capabilities 110 illustrated in FIG. 1 are examples of some of the types of functions that can be supported by an interaction center herein and is not meant to be an exhaustive or limiting listing. In some instances herein, aspects of the present disclosure will be discussed using examples related to customer service capability 125, such as customer service and support and/or a help desk. However, some if not all of the aspects disclosed herein may be applicable to support and facilitate other and alternative capabilities of interaction center 100.

Interaction center 100 further includes capabilities to control and manage the interaction center, as illustrated by management functions 135. In some aspects, data relating interactions between a customer and the business entity, including the business processes, services, and functions impacted by the interaction may be analyzed using one or more analytical functions 140. The analysis may be performed in an effort to improve communication with customers, improve the business processes that relate to interactions with customers, and a combination thereof.

Figure 2:
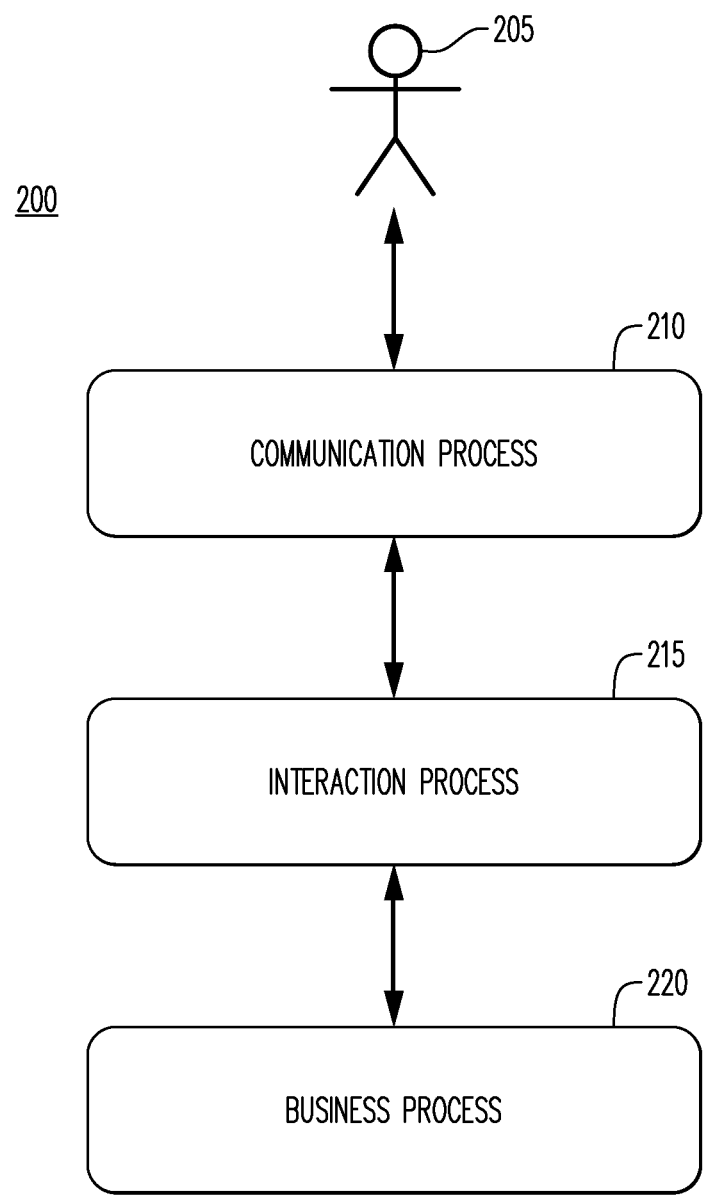
FIG. 2 is a block diagram overview of a process, according to some embodiments.

FIG. 2 is an illustrative overview of a process 200, according to some embodiments herein. Process 200 includes a customer 205 engaging in communicating with a business entity in a communication session. Communication process 210 may be initiated by either one of the customer and the business entity. The communication between the customer and the business entity is not limited to a particular type of communication. Having established communication with each other at 210, customer 205 and the business entity may interact to with each other to form or further a business relationship for one or more purposes related to the business operations of the business entity (e.g., a sale, a customer service support call, etc.). In some embodiments, aspects of communication process 210 may be automatically handled by a computer system.

As represented by business process 220, interaction process 215 may relate to or impact one or more business processes of the business entity. For example, a customer service call to a help desk may relate to numerous business processes and the records associated with the impacted business processes such as, for example, a customer record, a maintenance record, a customer support protocol, etc. In some embodiments, each of the business processes and records may be represented as BOs stored in a database.

Figure 3:
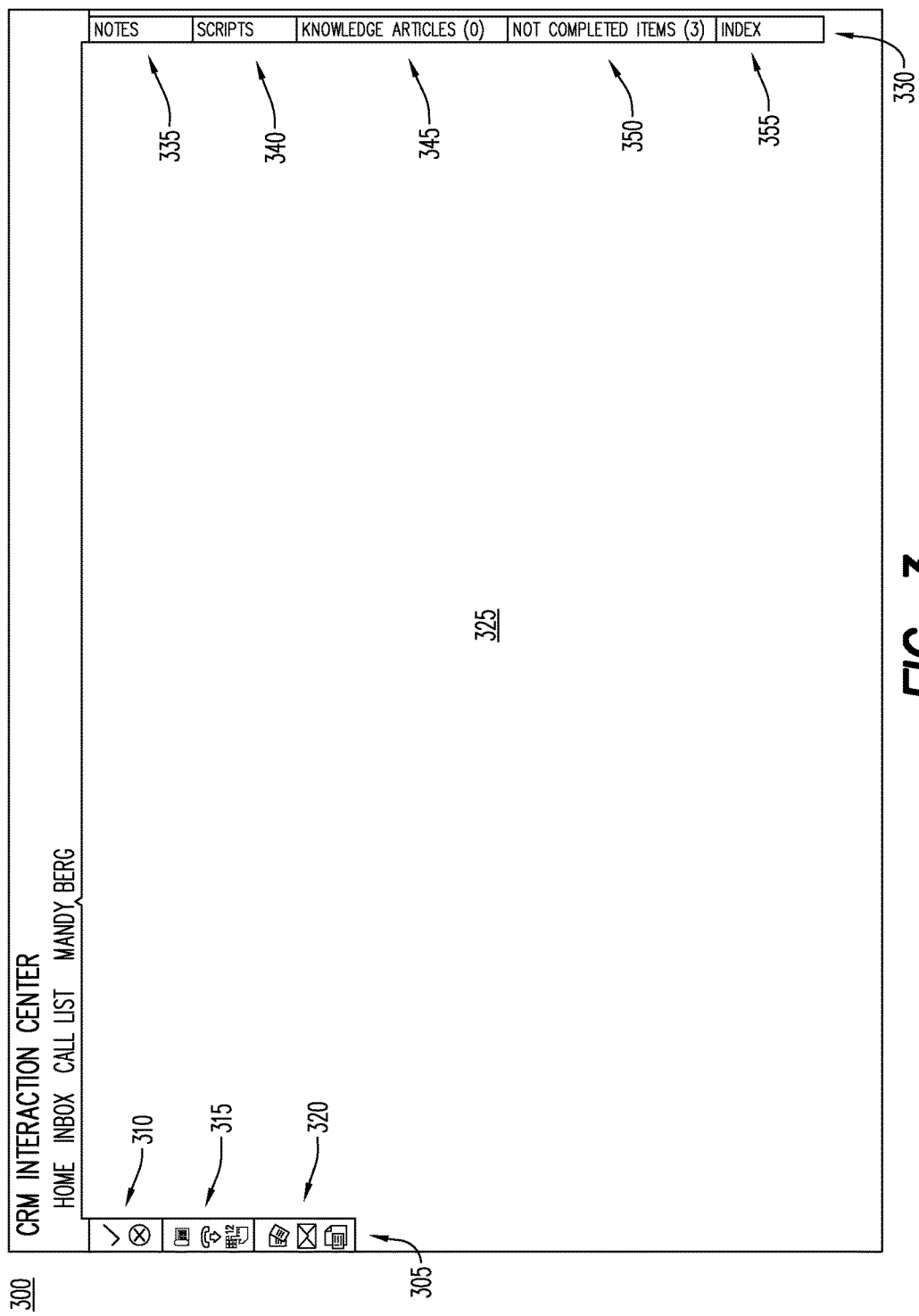
FIG. 3 is illustrates a layout of an interaction page, according to some embodiments.

In accordance with some embodiments, FIG. 3 is an illustrative example of an interaction page 300 comprising a user interface. Interaction page 300 includes a control toolbar 305, a workspace 325, and an assist area 330. Interaction control toolbar 305 may include user interface elements such as icons that provide a mechanism for a user to selectively navigate, activate, and control the user interface elements of interaction page 300. Interaction control toolbar 305 includes interaction controls 310 to end and clear/cancel actions or tasks. Interaction control toolbar 305 also includes communication controls 315 that facilitate communicating with a customer. These controls include an icon to select a particular communication channel (e.g., email, telephone, social network, etc.), hang up/end a communication session, open a dial pad, etc. Interaction control toolbar 305 also includes, in the embodiment of FIG. 3, creation controls 320 that enable a user to create a service request, create an email message, draft a letter, etc.

Workspace 325 comprises a user interface display pane that provides an overview of an interaction and can include one or more representations of the interactions between, for example, a business entity and a customer or client thereof, as well as representations of the relevant business objects (BOs) relating to the interactions. Herein, the relevant business objects relating to the interactions refer to those business objects that pertain to the specific interaction(s) between the business entity and the customer/client that are presented in the workspace. Accordingly, some embodiments herein may only present the representations of the business objects (e.g., graphical and/or textual) that directly related to or depend on the current interaction(s) displayed or presented in workspace 325. In some embodiments, the representations of the interactions and the relevant business objects are presented simultaneously in workspace 325. In this manner, the items presented in interaction page 300 may be displayed efficiently in a context-aware scenario, where a user need not navigate to a different screen or display to view or select relevant information pertaining to a current interaction as represented in the interaction page.

Assist area 330 of interaction page 300 includes user interface elements, controls or representations of customer related content and context related content. In the example of FIG. 3, assist area 330 includes user interface controls to open or select notes 335, scripts 340, knowledge articles 345 relating to interactions and processes depicted in the workspace, not completed tasks/open items 350, and an index of the business objects, interactions, and other aspects related to the items that may be displayed in workspace 325, which provides context for the displayed interaction(s).

In some embodiments, an interaction page includes the main aspects of an interaction between different entities, such as a business organization and a customer or client thereof. FIG. 4 is an illustrative example of an interaction page 400 that includes representations of both interactions and the corresponding, relevant business objects impacted by the interactions. According to the general layout of some embodiments of an interaction page, page 400 includes an interaction control toolbar 405, a workspace 410, and an assist area 415 that includes a plurality of user interface elements therein. Interaction page 400 further includes specific user interface element representations of interaction components (420, 425), identification components, (430, 435), and solutions related to the interactions (440, 445, 450). The interaction components 420 and 425 include information identifying the current communication or connection with the customer participating in the interaction and an interaction record including details of the current interaction, respectively. The identification components 430 and 435 include information identifying the business partner or owner and documents, products, or services relating to the interaction and the business partner, respectively. Regarding a solution for the issues concerning the current interaction, a communication to the customer such as outbound email 440 is shown in workspace 410, as well as a service request 445 initiated based on the current interaction and a knowledge article 450 containing information specific to the customer's specific issue being addressed in the current interaction.

Interaction page 400 conveniently and efficiently includes all of the pertinent and relevant information that relates to and/or is impacted by the current interaction in one user interface display pane. A user being presented with interaction page 400 may readily be informed of the various aspects of an interaction and the related business objects associated with the interaction with a particular customer. In some aspects, the user need not navigate to another user interface pane, application, or system in order to access information related to an interaction. As illustrated, features of the user interface representations of interactions and the relevant business objects include the various representations including summaries of the corresponding information. If desired, the full details of the information may be presented by a user selecting a user interface control element to expand the summary information. In some, if not all or most embodiments, the summary information is sufficient to provide the user with the information needed to effectively and efficiently manage the interaction with the customer. Accordingly, the extent of information included in the summaries may be customized in some embodiments.

Advantageously, some embodiments provide a technical solution to the technical problem of efficiently displaying needed information in a user interface display pane of an interaction page, where the relevant information related to a particular interaction is presented therein based on the parties involved in the interaction and the underlying business objects and context(s) of the interaction such that a user need not navigate to a separate display pane or application.

In some aspects, the business processes and data modeled by and represented as business objects (BOs) may include the relationships associating the interactions and the documents, records, and other data thereto. The BOs may be maintained and managed by a database system. In some instances, the interaction pages herein may be BOs that dynamically present the appropriate corresponding documents, records, and other data relating to an interaction based on the underlying business intelligence data captured and represented by the BOs.

FIGS. 5-13 illustrate various aspects of an interaction page, according to some embodiments. For example, FIGS. 5-13 disclose, at least in part, the connections between interactions and the corresponding data elements impacted and related thereto, including different user interface elements. FIG. 5 illustrates interaction page 500 that may be presented to a user (e.g., a call center customer service representative's home page) between interactions with a customer or client. As illustrated, information regarding the call center customer service representative including their role(s) may be captured at 505. The communication channels used and the queues the call center customer service representative is responsible for may be displayed at 510. Additional information relating to the call center customer service representative may also be included, such as but not limited to the open calls for the call center customer service representative. Upon receiving a call from a customer, the customer's name or other identifying information obtained from the incoming call may be displayed at 520.

Figure 6:
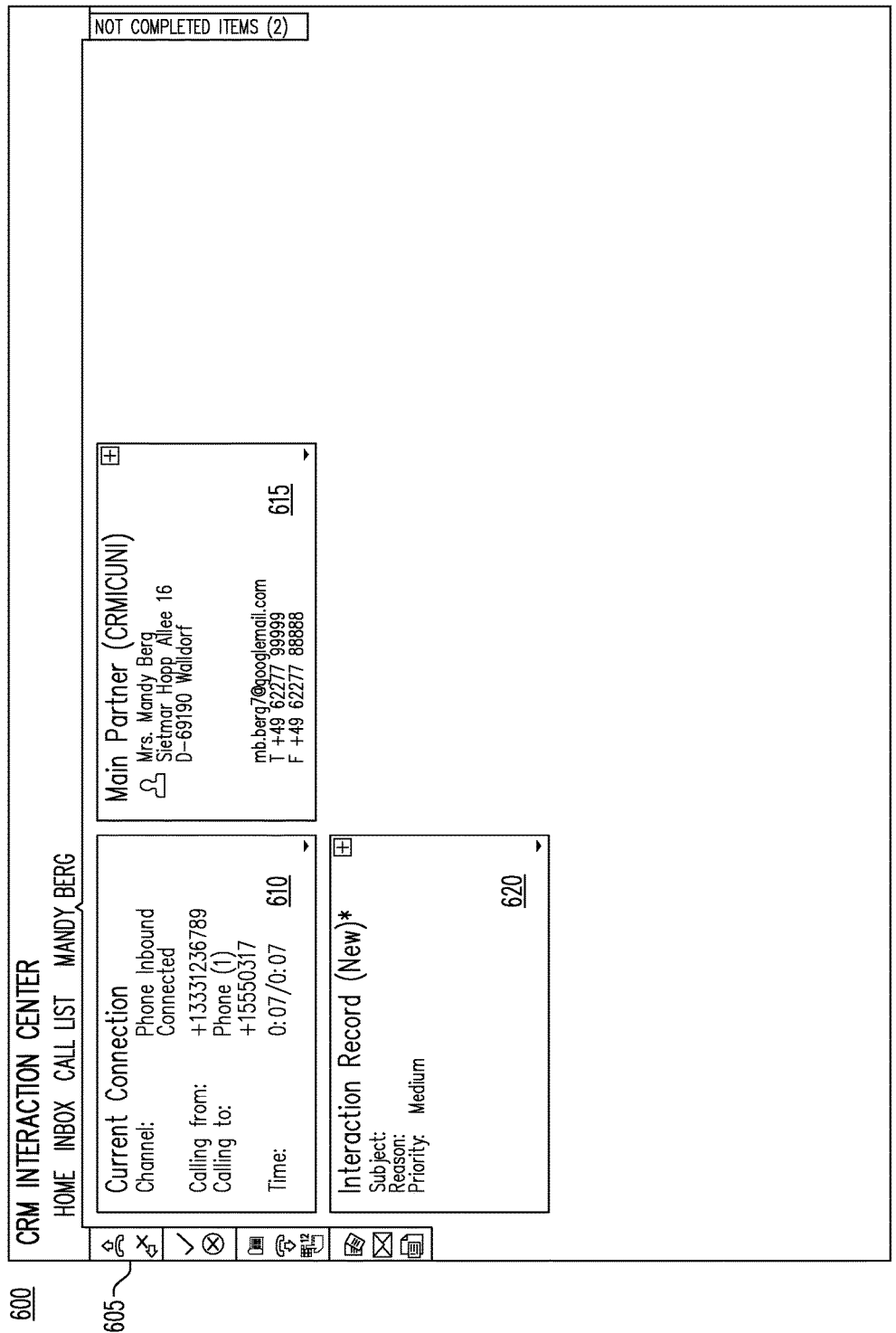

By accepting the incoming call, the call center customer service representative is presented with interaction page 600 of FIG. 6. The call may be accepted by the user selecting the user interface element/icon 605. Upon accepting the call, the user may be presented with the interaction representations 610, 615, and 620 that include the specific call data as obtained from the incoming call, the related business partner, and an interaction record to document the interaction. In the present example, it is noted that the interaction is new, thus a new record is created at 620. In some instances, an interaction may include a new or existing interaction, where accepting a call from an existing customer caller may cause a prior interaction record to be displayed in the interaction page. The account information is presented at 615 based on the caller's phone number and additional details may be viewed and accessed by expanding user interface representation 615.

In the interaction page 700 shown in FIG. 7, the call center customer service representative/user may document aspects of the interaction by entering comments, including structured and/or unstructured data, directly into the interaction record at 705. In this manner, the user need not navigate to a separate user interface pane or application in order to enter comments. In some aspects, by selecting user interface element 710, the user may be presented with additional user interface elements at 715 that provide a mechanism for the user to have related information regarding the client displayed. For example, the user can selected "registered products" and in response thereto the products registered to the client may be displayed at 720. This and other information corresponding to the interactions with the client may be accessed and retrieved from a data store and presented in an interaction page by selection one or more of the categories at 715.

Figure 8:
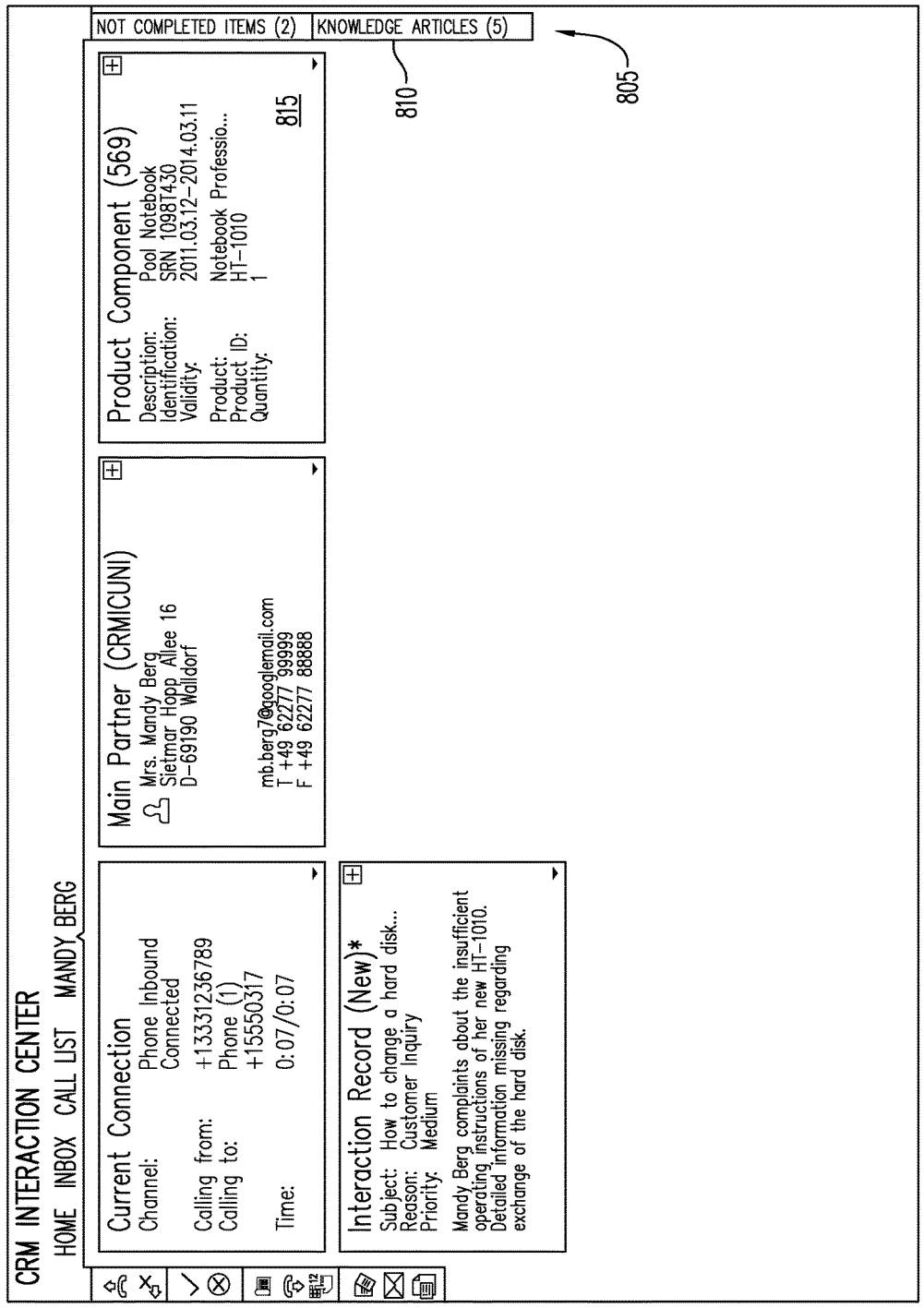
Figure 9:
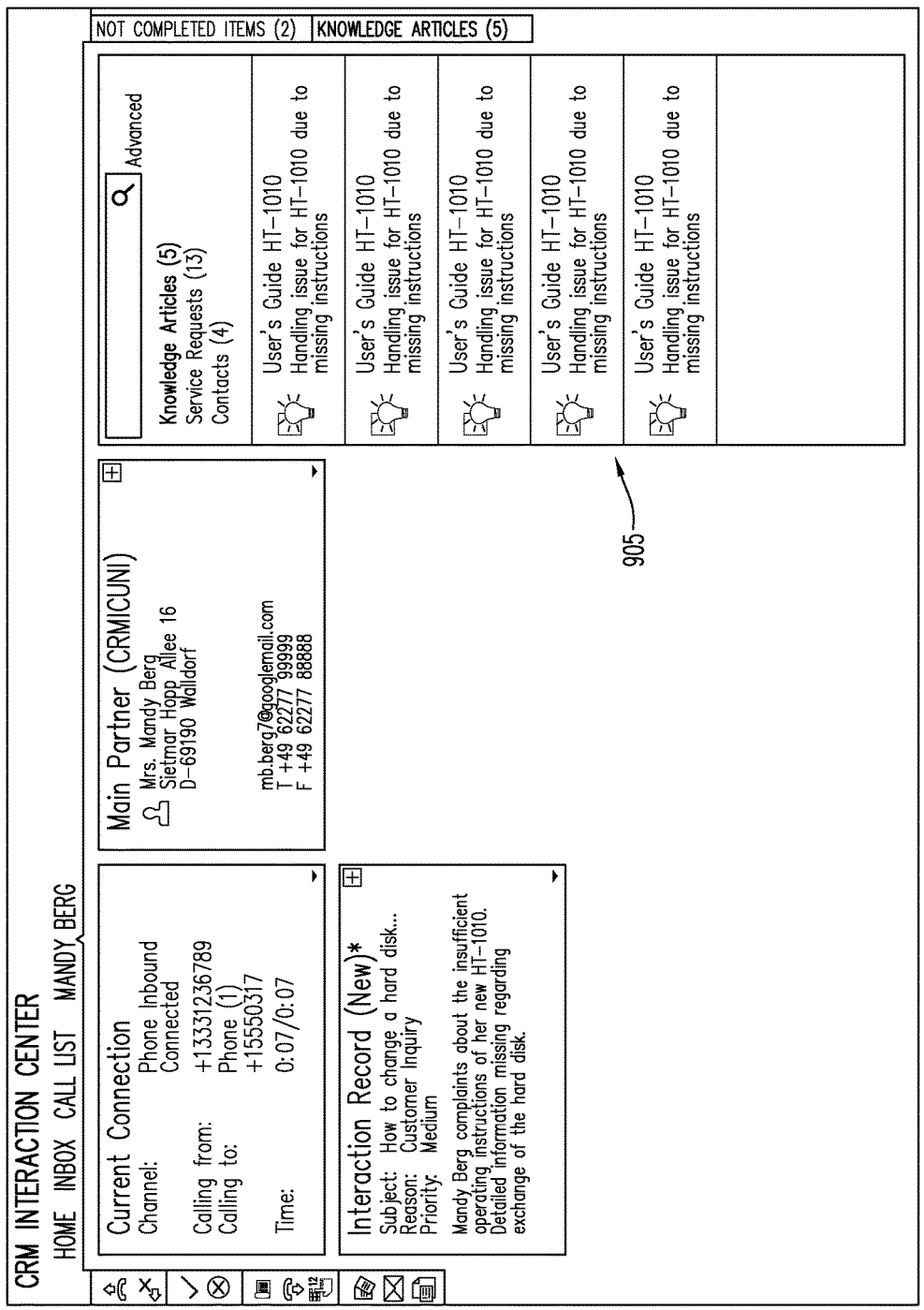

The user may select one of the products displayed at 720 to cause the interaction page 800 of FIG. 8 to be displayed. Furthermore, based on the user's input at 705 and the selection of a particular product at 720, which is now shown at 815, a possible solution to the customer's issue (e.g., a complaint regarding the specific product) may be indicated in assist area 805 at tab 810.

By selecting the "Knowledge Articles" tab 810, the user is presented with interaction page 900. Based on the user's selections, interaction page 900 includes, like the other instances of interaction pages herein, the relevant business objects representations impacted by the subject interaction(s). Accordingly, interaction page 900 includes a listing of the five different articles defined as being possible solutions to the customer's complaint issue at 905. Additionally, the user may create a service request for the current interaction by selecting user interface element 910.

Figure 10:
Figure 12:
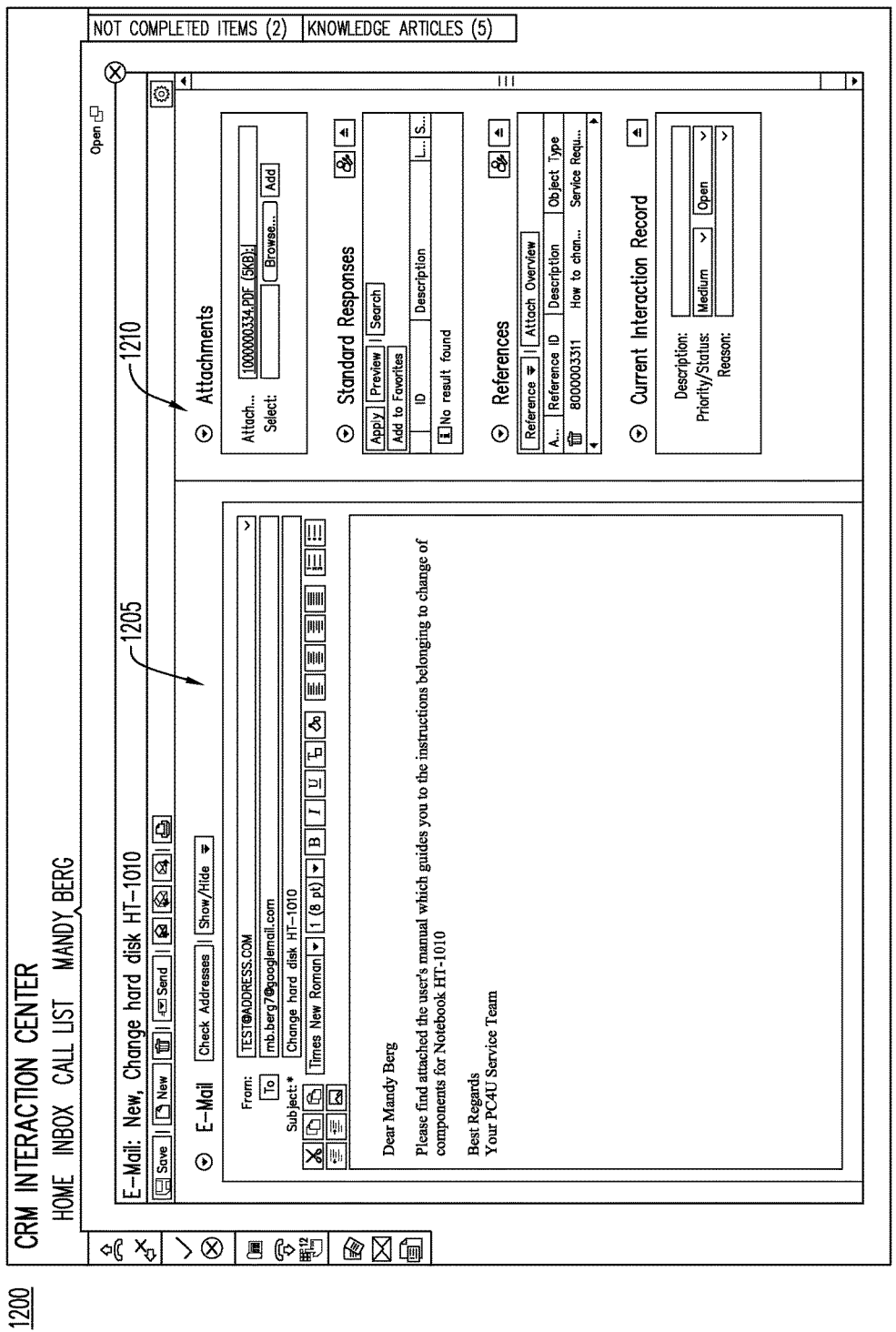

Upon creating the service request for the current interaction by selecting user interface element 910, interaction page 1000 of FIG. 10 may be presented to the user. Interaction page 1000 includes a user interface representation 1005 of the previously selected knowledge article "471108815" that the user and the system determines to be most applicable to the customer's issue. Interaction page 1000 also includes a user interface representation 1015 of the newly created service request. It is noted that the user can, in some embodiments, enter key information directly into the newly created service request without a need to navigate to a separate display pane or application. Furthermore, by selecting user interface element 915 (create an email icon) of FIG. 9, an outgoing email may be automatically initiated as illustrated by the user interface element representation 1020. The email may, in some embodiments, automatically attach the associated knowledge article 1005, pre-populate certain fields (e.g., "To", "Subject", etc.) based on the known, related customer information. In some embodiments, the content of the email may be automatically derived, at least in part, based on the context interaction, including but not limited to the interaction record, the service request, the knowledge article, etc.

FIG. 11 includes a depiction of an interaction page 1100 that may be presented to a user as the user provides the determined solution to the customer, proceeds to end the call with the user, and ends the present interaction. The user may end the call by selecting the "hang up" user interface element/icon 1105. Upon ending the call, the user may send the email 1110 that includes the solution information to the customer. In some aspects, the user may cross check and/or finalize the email before sending it to the customer. In order to facilitate editing and finalization of the email, the interaction page may dynamically evolve to the configuration of interaction page 1200 illustrated in FIG. 12. As shown, interface page 1200 includes an expanded view of the email 1205 to be sent to the customer, including a display of the relevant information 1210 that may be used in drafting the email.

Upon finalization of the email, the email may be sent to the customer and interaction page 1300 of FIG. 13 can be presented to the user. As shown, a representation of the sent email is presented at 1305, including an identifier that the email has been sent to the addressed recipient(s). The interaction may thereafter be closed by selecting user interface element/icon 1310, wherein a record of the interaction including the email, service request, and other data created, modified, deleted, or otherwise impacted by the interaction is stored and indexed (if not already accomplished) for further retrieval, processing, and analysis.

Figure 14:
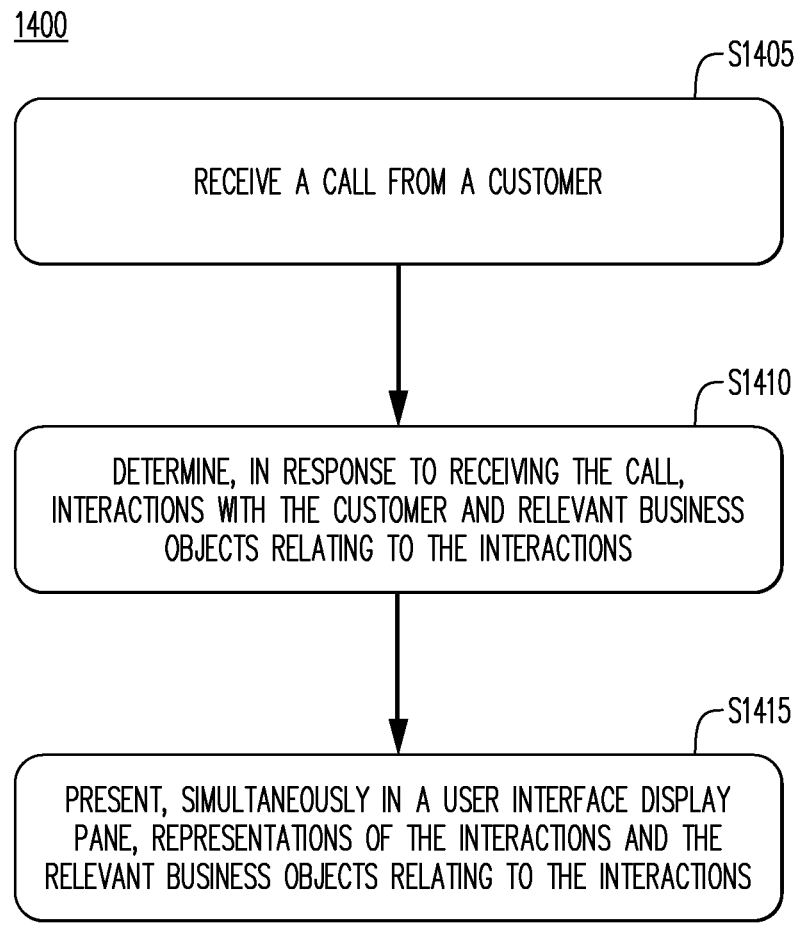
FIG. 14 is a flow diagram of a process, according to some embodiments.

FIG. 14 is a flow diagram of process 1400, according to some embodiments. Process 1400 and the other processes described herein may be performed using any suitable combination of hardware, software or manual means. Software embodying these processes may be stored by any non-transitory tangible medium, including a fixed disk, a floppy disk, a solid state drive, a CD, a DVD, a flash drive, or a magnetic tape. According to some embodiments, process 1400 is performed by a computing device such as computing device 1600 that will be described in greater detail hereinbelow.

Initially, a call may be received, by a user such as a business entity, from a customer at operation S1405. In some aspects, the customer may be an existing customer having previous one or more interactions with the business entity. In some instances, the call may be received from a prospective or new customer having no previous interactions with the business entity. In some embodiments a call may be either an inbound call or an outbound call, wherein the call is "received" by a system facilitating management of calls, whether inbound or outbound.

In some aspects, the call includes a communication of at least one type. In some embodiments, the call may include at least one of a telephone call, an email message, a social network communication, a video call, and a text message.

At operation S1410, process 1400 proceeds to determine, in response to receiving the call, interactions with the customer and relevant business objects relating to the interactions. As stated hereinabove and demonstrated by the various embodiments of interaction pages illustrated in FIGS. 4-13, the impacted business objects may include documents, files, structured data, unstructured data, and business processes that may be associated with other data and business processes. In some embodiments, the impacted business objects may be modeled as BOs and instantiated as specific instances adhering thereto.

In some embodiments, the determining of the interactions and the relevant business objects may include referencing stored data for indications of the customer based on identifying information received in the call, determining prior interactions with the customer as indicated in the stored data, and determining the relevant business objects by referencing the stored data for business objects related to, for example, the customer and the prior interactions.

Flow of process 1400 continues to operation S1415 where representations of the interactions and the relevant business objects relating to the interactions are simultaneously presented in a user interface display pane. As disclosed herein, the user interface display pane may comprise a workspace (e.g., 325 in FIG. 3) of an interaction page. In some embodiments, the simultaneously presented representations of the interactions and the relevant business objects relating thereto are configured in at least one of user interface tabs and user interface tiles. Referring to FIG. 4, for example, the representations of the interactions and the relevant business objects relating thereto are configured as user interface tiles 420, 425, 430, 435, 440, 445, and 450. In some embodiments, the user interface tabs and user interface tiles of the interactions and the relevant business objects may be configured and contained within a parent tab. For example, an interaction page may possibly display multiple parent tabs or tiles, where each parent tile contains all of the user interface tabs and user interface tiles of the interactions and the relevant business objects relating to a specific call in the same parent tab or tile.

Figure 15:
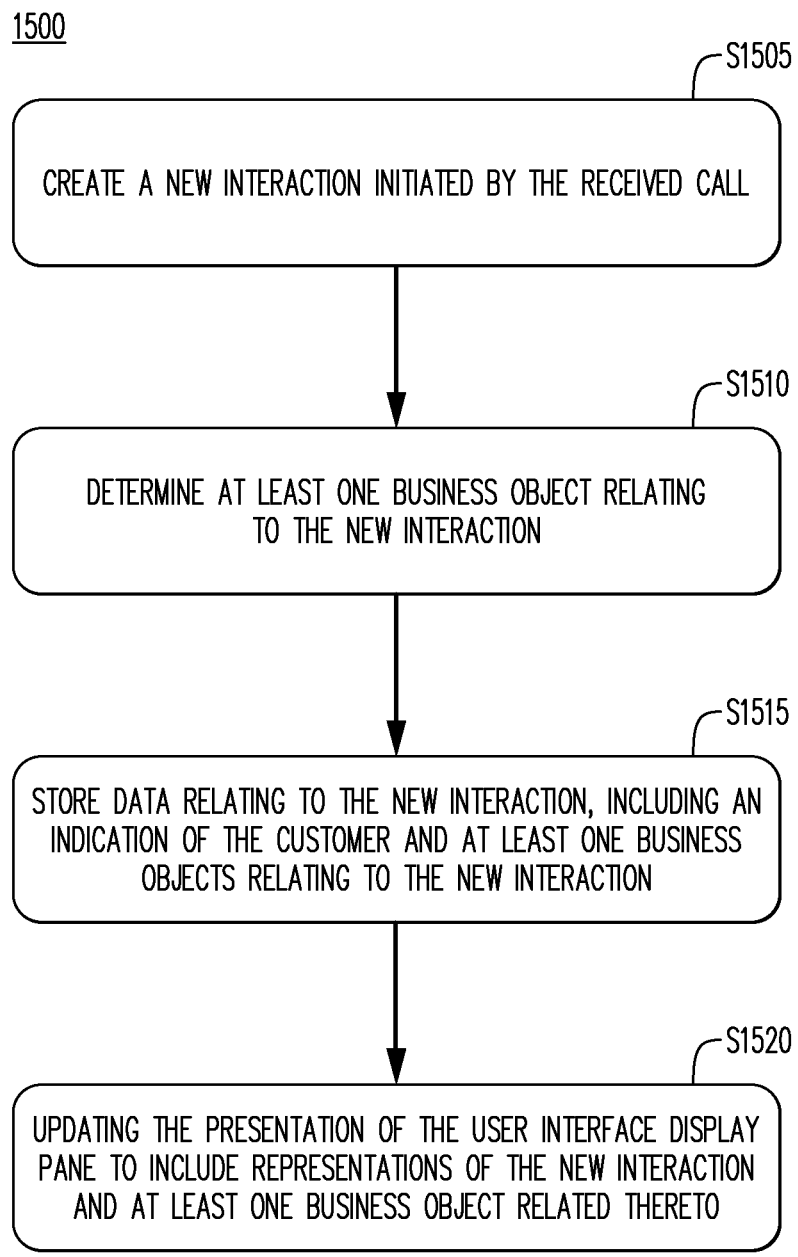
FIG. 15 is a flow diagram of a process, according to some embodiments.

FIG. 15 is a flow diagram of process 1500, according to some embodiments. Process 1500 includes an operation S1505 of creating a new interaction that is initiated by a received call. In some instances a previous interaction may be continued but in the instance of process 1500 a new interaction is created. In response to the creation of the new response, at least one business object relating to the new interaction is determined at S1510. The business object may be determined from a plurality of business functions supported and provided by a business entity.

At operation S1515, the flow of process 1500 continues to store data relating to the new interaction. In some aspects, the stored data may include at least an indication of the customer and the at least one business object determined at operation S1510. Based on and in response to the stored data, the presentation of the user interface display pane of an interaction page may be updated at 1520. Updating of the display pane may include modifying the user interface elements presented therein to include new, modified, altered, alternative, and otherwise different user interface representations of the new interaction and the at least one business object relating thereto.

Embodiments are not limited to the illustrated operations and the foregoing description thereof.

Figure 16:
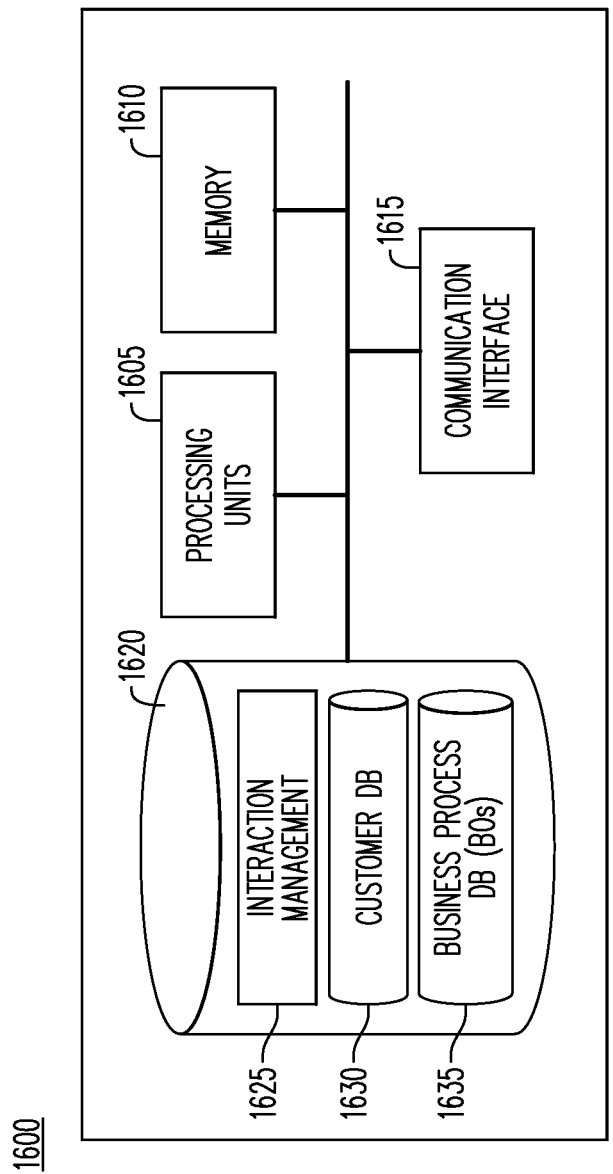
FIG. 16 is a block diagram of a system according to some embodiments.

FIG. 16 is a block diagram of general-purpose or dedicated computing device 1600 according to some embodiments. Computing device 1600 may, for example, be operated by a business entity executing a customer relationship management (CRM) system. Computing device 1600 includes processing units 1605 (e.g., processor cores and/or processing threads) configured to execute processor-executable program code or program instructions to cause device 1600 to operate as disclosed herein, and storage device 1620 for storing the program code or program instructions. Storage device 1620 may comprise one or more fixed disks, solid-state random access memory, and/or removable media (e.g., a thumb drive) mounted in a corresponding interface (e.g., a USB port).

Storage device 1620 stores program code of interaction management program 1625. Customer database 1630 includes database records describing the customers, existing and prospective customers (i.e., leads) that may be interacted with through services provided by computing device 1600. The database record for a customer may specify, for example, the customer's contact information (phone number, email, social network(s) username(s), etc.), including names, titles, responsibilities, date of first contact, date of last contact, preferred method of contact, demographic information, etc.

Business process database 1635 may include BOs representing business processes supported, facilitated, and provided by the business entity. In some regards, the BOs may represent data including but not limited to reports, records of interactions, product registrations, service requests, knowledge articles and other product or service support documents, processes for processing claims, etc.

In some embodiments, database 1635 may comprise any one or more systems to store data. The data stored in database 1635 may be received from disparate hardware and software systems, some of which are not interoperational with one another. The systems may comprise a back-end data environment employed in a business or industrial context. The data may be pushed to database 410 and/or provided in response to queries received therefrom.

In some embodiments, database 1635 may be implemented in Random Access Memory (e.g., cache memory for storing recently-used data) and one or more fixed disks (e.g., persistent memory for storing the full database). Alternatively, database 1635 may implement an "in-memory" database, in which volatile (e.g., non-disk-based) memory (e.g., Random Access Memory) is used both for cache memory and for storing the full database. In some embodiments, the data of the full database may comprise one or more of conventional tabular data, row-based data, column-based data, and object-based data. Database 1635 may also or alternatively support multi-tenancy by providing multiple logical database systems which are programmatically isolated from one another. Moreover, the data of database 1635 may be indexed and/or selectively replicated in an index.

The program code of interaction program 1625 may be transferred to memory 1610 for execution by processing units 1605 to record interactions with a customer and to determine the relevant business objects impacted by the interactions between the customer and the business entity. Furthermore, the program code may be executed by the processing units to present the interaction pages herein in a manner (i.e., flow) and a configuration as disclosed herein. Communication interface 1615 may be used to communication the interaction pages to a suitable display device, as well as receive and send communications from and to the customer. Computing device 1600 may perform functions other than those attributed thereto herein, and may include any elements which are necessary for the operation thereof.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A computer-implemented method to process calls by a call center, the method comprising:
   receiving, by an organization, a call from a customer;
   creating a new interaction initiated by the received call;
   displaying a representation of the new interaction within a user interface pane on a display screen, the representation of the new interaction including details of the new interaction;
   determining, in response to receiving the call, relevant business objects directly relating to the new interaction, each of the relevant business objects being stored in a database and being an instantiation of a modeled data structure representing a process of the organization impacted by the new interaction, the determining of the relevant business objects comprising:
   referencing data stored in the database for indications of the customer based on identifying information received in the call;
   determining prior interactions with the customer as indicated in the stored data; and
   determining the relevant business objects by referencing the stored data for business objects related to, at least, the customer and the prior interactions;
   storing data relating to the new interaction in a memory, including at least an indication of the customer and the determined relevant business objects related to the new interaction; and
   updating, by a processor, the user interface display pane to include a simultaneous displaying of the representation of the new interaction and representations of the determined relevant business objects related to the new interaction in a tiled view, the representations of the determined relevant business objects related to the new interaction including a display of at least summary information for each of the determined relevant business objects with at least one of the representations of the determined relevant business objects including an indication of a call type, call to information details, call from information details, and an elapsed call duration for the new interaction.

2. The method of claim 1, wherein the customer is one of an existing customer and a prospective customer.

3. The method of claim 1, wherein the call comprises a communication of at least one of the following types: a telephone call, an email message, a social network communication, a video call, and a text message.

4. The method of claim 1, wherein the call is received by a customer relationship management system.

5. The method of claim 1, wherein the simultaneously presented representations of the new interaction and the determined relevant business objects relating to the new interaction are configured in at least one of user interface tabs and user interface tiles, including a parent tab that contains all of the user interface tabs and user interface tiles of the new interaction and the determined relevant business objects.

6. The method of claim 1, further comprising presenting in the user interface display pane an assist area that includes representations of at least one of customer related content and context related content.

7. A system to process calls by a call center, the system comprising:
   a computing device comprising:
   a communication interface;
   a memory storing processor-executable program code; and
   a processor to execute the processor-executable program code in order to cause the computing device to:
   receive, by an organization, a call from a customer;
   create a new interaction, the new interaction being initiated by the received call;
   display a representation of the new interaction within a user interface pane on a display screen the representation of the new interaction including details of the new interaction;
   determine, in response to receiving the call, relevant business objects directly relating to the new interaction, each of the relevant business objects being stored in a database and being an instantiation of a modeled data structure representing a process of the organization impacted by the new interaction, the determining of the relevant business objects comprises the processor executing the processor-executable program code in order to further cause the computing device to:
  reference data stored in the memory for indications of the customer based on identifying information received in the call;
  determine prior interactions with the customer as indicated in the stored data; and
  determine the relevant business objects by referencing the stored data for business objects related to, at least, the customer and the prior interactions;
  store data relating to the new interaction in a memory, including at least an indication of the customer and the determined relevant business objects related to the new interaction; and
  update the user interface display pane to include a simultaneous displaying of the representations of the new interaction and representations of the determined relevant business objects related to the new interaction in a tiled view, the representations of the determined relevant business objects related to the new interaction including a display of at least summary information for each of the determined relevant business objects with at least one of the representations of the determined relevant business objects including an indication of a call type, call to information details, call from information details, and an elapsed call duration for the new interaction.

8. The system of claim 7, wherein the customer is one of an existing customer and a prospective customer.

9. The system of claim 7, wherein the call comprises a communication of at least one of the following types: a telephone call, an email message, a social network communication, a video call, and a text message.

10. The system of claim 7, wherein the simultaneously presented representations of the new interaction and the determined relevant business objects relating to the new interaction are configured in at least one of user interface tabs and user interface tiles, including a parent tab that contains all of the user interface tabs and user interface tiles of the new interaction and the determined relevant business objects.

11. The system of claim 7, further comprising the processor to execute the processor-executable program code in order to further cause the computing device to present an assist area in the user interface display pane that includes representations of at least one of customer related content and context related content.

12. A non-transitory computer-readable medium storing program code executable by a processor of a computing system to process calls by a call center, the medium comprising:
  program code to receive, by an organization, a call from a customer;
  program code to create a new interaction, the new interaction being initiated by the received call;
  program code to display a representation of the new interaction within a user interface pane on a display screen the representation of the new interaction including details of the current interaction;
  program code to determine, in response to receiving the call, relevant business objects directly relating to the new interaction, each of the relevant business objects being stored in a database and being an instantiation of a modeled data structure representing a process of the organization impacted by the new interaction, the determining of the relevant business objects comprising:
  referencing data stored in the memory for indications of the customer based on identifying information received in the call;
  determining prior interactions with the customer as indicated in the stored data; and
  determining the relevant business objects by referencing the stored data for business objects related to, at least, the customer and the prior interactions;
  program code to store data relating to the new interaction in a memory, including at least an indication of the customer and the determined relevant business objects related to the new interaction; and
  program code to update the user interface display pane to include a simultaneous displaying of the representation of the new interaction and representations of the determined relevant business objects related to the new interaction in a tiled view, the representations of the determined relevant business objects related to the new interaction including a display of at least summary information for each of the determined relevant business objects with at least one of the representations of the determined relevant business objects including an indication of a call type, call to information details, call from information details, and an elapsed call duration for the new interaction.

13. The non-transitory computer-readable medium of claim 12, wherein the customer is one of an existing customer and a prospective customer.

14. The non-transitory computer-readable medium of claim 12, wherein the call comprises a communication of at least one of the following types: a telephone call, an email message, a social network communication, a video call, and a text message.

15. The non-transitory computer-readable medium of claim 12, wherein the simultaneously presented representations of the new interaction and the determined relevant business objects relating to the new interaction are configured in at least one of user interface tabs and user interface tiles, including a parent tab that contains all of the user interface tabs and user interface tiles of the new interaction and the determined relevant business objects.

16. The non-transitory computer-readable medium of claim 12, further comprising program code to present an assist area in the user interface display pane that includes representations of at least one of customer related content and context related content.

\* \* \* \* \*